A. J. MUMMERT.
PACKING RING.
APPLICATION FILED MAR. 18, 1915.

1,210,674.

Patented Jan. 2, 1917.

WITNESSES:
Harry A. Beiner
Edw M. Siegel

INVENTOR.
Arden J. Mummert.
BY
Emil Starek
ATTORNEY.

UNITED STATES PATENT OFFICE.

ARDEN J. MUMMERT, OF ST. LOUIS, MISSOURI.

PACKING-RING.

1,210,674.

Specification of Letters Patent.  Patented Jan. 2, 1917.

Application filed March 18, 1915.  Serial No. 15,322.

*To all whom it may concern:*

Be it known that I, ARDEN J. MUMMERT, a citizen of the United States, residing at St. Louis, State of Missouri, have invented certain new and useful Improvements in Packing-Rings, of which the following is a full, clear, and exact description, reference being had to the accompanying drawings, forming a part hereof.

My invention has relation to improvements in piston-head packing rings; and it consists in the novel features of construction more fully set forth in the specification and pointed out in the claims.

The present invention is directed in particular to packing rings for pistons of gas engine cylinders, where it is essential to prevent the lubricating oil distributed as a film over the inner cylinder walls (as a result of splashing from the crank case) from entering the combustion or explosion chamber of the engine. Any presence of oil in the explosion chamber results in uneven explosions; besides the residue resulting from the burning of the oil in said chamber produces a heat insulating layer or deposit on the walls of said chamber which prevents successful cooling of the same, and hence interfering with the operation of the engine and impairing its efficiency.

The object of my invention is to provide the piston with a packing ring which will effectively prevent any lubricant finding its way into the explosion chamber, such provision insuring uniform explosions and a high efficiency.

The advantages of the invention will be clearly apparent from a detailed description of the same in connection with the accompanying drawing in which—

Figure 1:
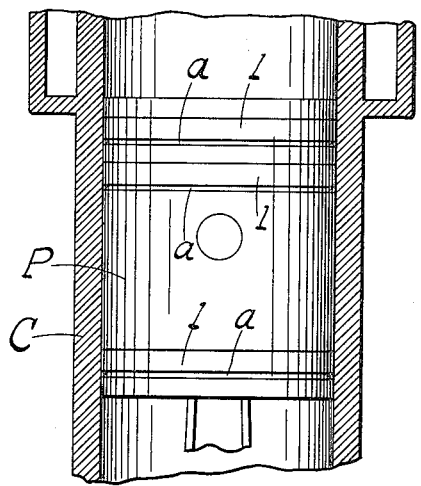
Figure 4:
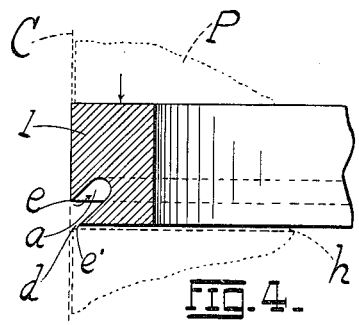
Figure 2:
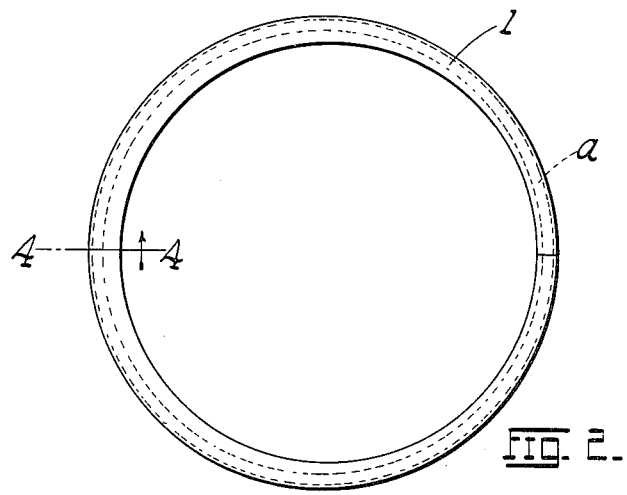
Figure 3:
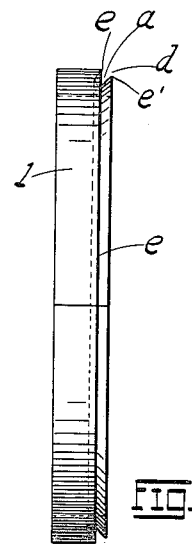

Figure 1 represents a longitudinal section of a gas engine cylinder, with the piston in elevation showing a series of three rings applied thereto; Fig. 2 is a plan of the ring, plied thereto; Fig. 3 is an edge view thereof; Fig. 4 is an enlarged cross-section on the line 4—4 of Fig. 2; and Fig. 5 is a plan of a modified form of ring, the same being concentric instead of eccentric as shown in Fig. 2.

Referring to the drawings, and for the present to Figs. 1 to 4 inclusive, C represents the engine cylinder and P the piston, the same being here shown as equipped with a series of three rings. The ring comprises a resilient imperforate annular split band 1 which is deposited (as well understood in the art) in the annular peripheral groove $h$ of the piston, the band being expanding in character and tending to hug the walls of the cylinder when inserted thereinto. Disposed along the outer cylindrical face of the ring or band contiguous to the side thereof which faces the crank case (not shown) or at what corresponds to the outer lower corner of the band, is a basin or receptacle or equivalent chamber $a$ the walls whereof terminate respectively in a cutting or shearing edge $e$, which for convenience may be termed the "upper" edge (the piston being supposed to be driven downward by the exploding mixture of gasolene vapor and air or its equivalent) and in a lower edge $e'$ as shown (Fig. 4). The edge $e$ scrapes the inner walls of the cylinder C with a downward or driving stroke of the piston, thus scraping up the film of oil on the cylinder walls, the oil scraped up finding its way into the basin $a$ past the edge $e'$ through the annular passage-way or clearance $d$ formed between the cylinder walls and the edge $e'$ which is spaced the necessary distance from said walls. The walls of the basin $a$ are inclined to the axis of the ring (the lower wall of the basin only need be so inclined) so that on the upstroke of the piston, the oil gathered in the basin by the downstroke, may be released and caused to be spread over the cylinder walls. The inclination of the lower wall of the basin $a$ serves to effect an even distribution of the oil thus released on the upstroke, the inclined surface of such lower wall serving to direct the released oil over the discharge or clearing edge $e'$ against the walls of the cylinder and causing the oil to spread evenly thereover. In order that the edge $e'$ may direct the released oil against the cylinder walls, said edge should, as shown in Fig. 4, be substantially coincident or nearly so, with the piston-head periphery so that no material quantity of oil will lodge on the lower side wall of the groove $h$ in which the packing ring is housed. Preferably, the clearing edge $e'$ (see Fig. 4) is disposed substantially in the plane of the adjacent side of the ring, although a slight variation from this position would in no wise affect the spirit of my invention, nor would I consider it a departure therefrom. The bottom of the basin $a$ is disposed in a transverse plane rearward of the cutting edge $e$ as shown to best advantage in Fig. 4.

Figure 5:
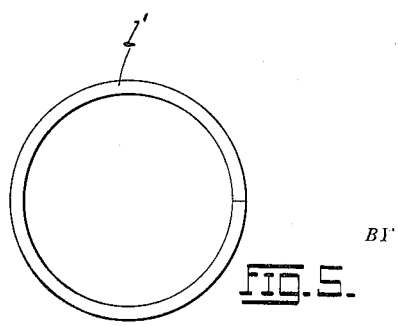

In order that the outer cylindrical face of the ring or band 1 shall hug the inner walls of the cylinder uniformly throughout, the ring is preferably of the eccentric variety as shown (Fig. 2), rings of that class being more evenly resilient than rings of the concentric variety such as shown in Fig. 5, where a concentric ring 1' is illustrated.

I do not of course wish to be limited to the particular form of basin *a* here shown, nor to annularly continuous basins; any receptable, pocket, depression, chamber or equivalent means for collecting or gathering oil or other liquid accumulations from the inner walls of the cylinder with a given stroke of the piston being herein contemplated and falling within the spirit of my invention.

The invention of course need not be restricted in its application to gas engines, but may be employed in any engine or other apparatus provided with a reciprocating piston or its equivalent.

Having described my invention what I claim is:—

1. A piston-head packing ring for engine cylinders comprising a resilient imperforate split band provided with an annular peripheral basin bounded on one side by a wall inclined to the axis of the ring and terminating in an edge disposed substantially in the plane of one side of the ring, said edge clearing the walls of the cylinder, and bounded on the opposite side by an inclined wall terminating in a cutting edge operating to scrape the oil from the cylinder walls into the basin with a forward stroke of the piston, the bottom of the basin being disposed in a transverse plane rearward of the cutting edge aforesaid.

2. A piston-head packing ring for engine cylinders comprising a resilient imperforate split band provided with an annular peripheral basin bounded on one side by a wall inclined to the axis of the ring and terminating in an edge disposed substantially in the plane of one side of the ring, said edge clearing the walls of the cylinder, and bounded on the opposite side by a similarly inclined wall terminating in a cutting edge operating to scrape the oil from the cylinder walls into the basin with a forward stroke of the piston, the bottom of the basin being disposed in a transverse plane rearward of the cutting edge aforesaid.

3. A piston-head packing ring for engine cylinders comprising a resilient imperforate split band provided with an annular peripheral basin bounded on one side by a wall inclined to the axis of the ring and terminating in an edge disposed substantially in the plane of one side of the ring, said edge being substantially coincident with the piston-head periphery and clearing the walls of the cylinder, and bounded on the opposite side by an inclined wall terminating in a cutting edge operating to scrape the oil from the cylinder walls into the basin with a forward stroke of the piston, the bottom of the basin being disposed in a transverse plane rearward of the cutting edge aforesaid.

4. A piston-head packing ring for engine cylinders comprising a resilient imperforate split band provided with an annular peripheral basin bounded on one side by a wall inclined to the axis of the ring and terminating in an edge disposed substantially in the plane of one side of the ring, said edge being substantially coincident with the piston-head periphery and clearing the walls of the cylinder, and bounded on the opposite side by a similarly inclined wall terminating in a cutting edge operating to scrape the oil from the cylinder walls into the basin with a forward stroke of the piston, the bottom of the basin being disposed in a transverse plane rearward of the cutting edge aforesaid.

In testimony whereof I affix my signature, in presence of two witnesses.

ARDEN J. MUMMERT.

Witnesses:
 EMIL STAREK,
 ELSE M. SIEGEL.